(12) United States Patent
Horii et al.

(10) Patent No.: US 7,522,814 B2
(45) Date of Patent: Apr. 21, 2009

(54) INFORMATION RECORDING MEDIUM, RECORDING APPARATUS, EDITING APPARATUS, REPRODUCTION APPARATUS, RECORDING METHOD, EDITING METHOD, AND REPRODUCTION METHOD

(75) Inventors: Noriaki Horii, Osaka (JP); Masatoshi Shimbo, Hyogo (JP)

(73) Assignee: Panasonic Corporation, Kadoma (JP)

( * ) Notice: Subject to any disclaimer, the term of this patent is extended or adjusted under 35 U.S.C. 154(b) by 1121 days.

(21) Appl. No.: 10/390,226

(22) Filed: Mar. 17, 2003

(65) Prior Publication Data
US 2003/0219225 A1 Nov. 27, 2003

(30) Foreign Application Priority Data
May 24, 2002 (JP) ............................. 2002-151606

(51) Int. Cl.
*H04N 5/91* (2006.01)
(52) U.S. Cl. .......................................... 386/52; 386/94
(58) Field of Classification Search ................... 386/94, 386/95, 46, 52, 107, 117
See application file for complete search history.

(56) References Cited
U.S. PATENT DOCUMENTS
6,424,797 B1 7/2002 Murase et al.

7,231,133 B2 * 6/2007 Kasai ........................... 386/94
2001/0030827 A1 10/2001 Morohashi

FOREIGN PATENT DOCUMENTS

| CN | 1345447 A | 4/2002 |
|----|-----------|--------|
| EP | 1 041 565 A1 | 10/2000 |
| EP | 1 056 094 A1 | 11/2000 |
| EP | 1 130 496 A2 | 9/2001 |

OTHER PUBLICATIONS

International Search Report for corresponding Application No. PCT/JP2003/03207 dated Feb. 13, 2004.
Singapore Office Action for corresponding Application No. SG 2004-3721-4 dated Dec. 13, 2005.
Chinese Office Action dated Oct. 10, 2008 issued in the corresponding Chinese Patent Application No. 03811862.9 and English translation thereof.

* cited by examiner

*Primary Examiner*—Huy T Nguyen
(74) *Attorney, Agent, or Firm*—Renner, Otto, Boisselle & Sklar, LLP

(57) ABSTRACT

An information recording medium is for recording of information, and identification information indicating whether the information is an album content distributed by electronic distribution or information edited by a user.

8 Claims, 18 Drawing Sheets

Play list

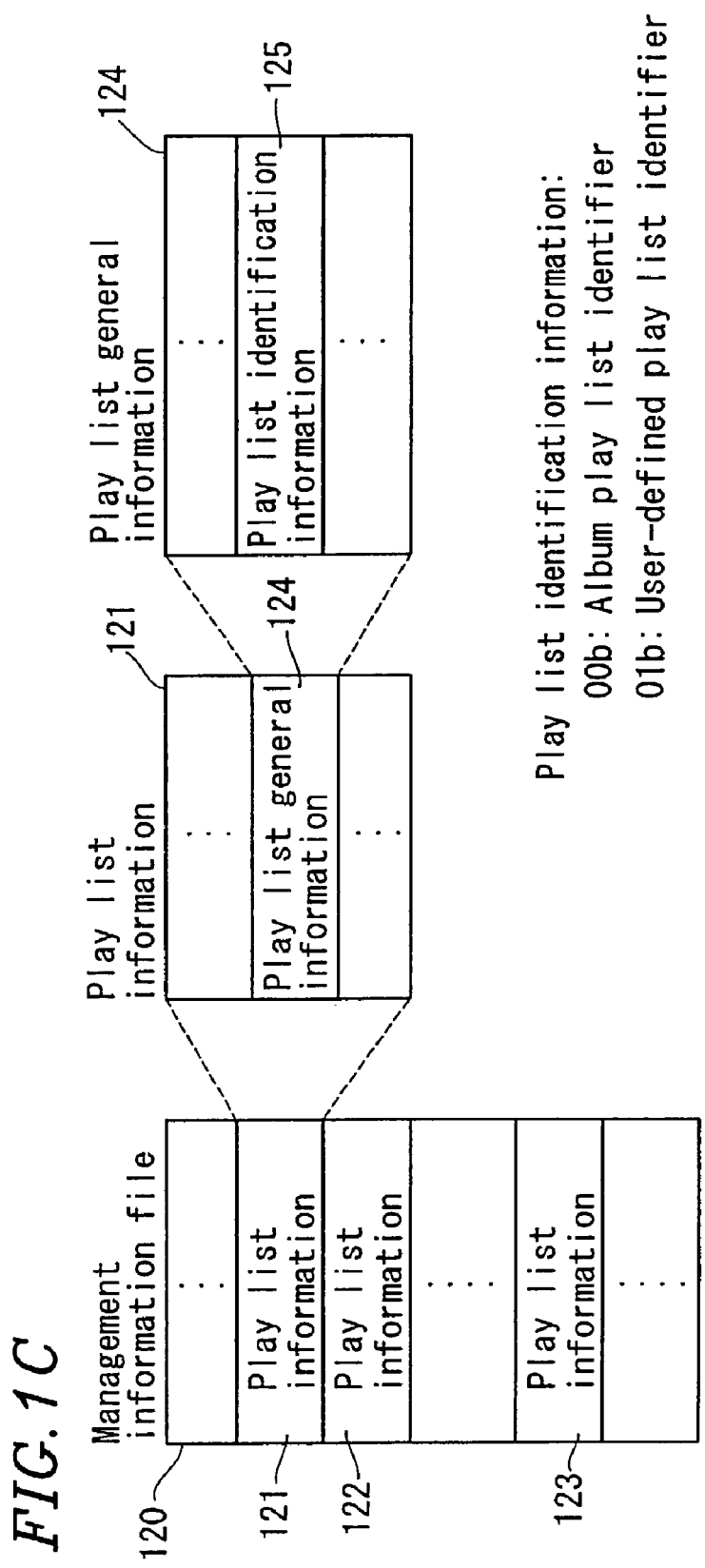

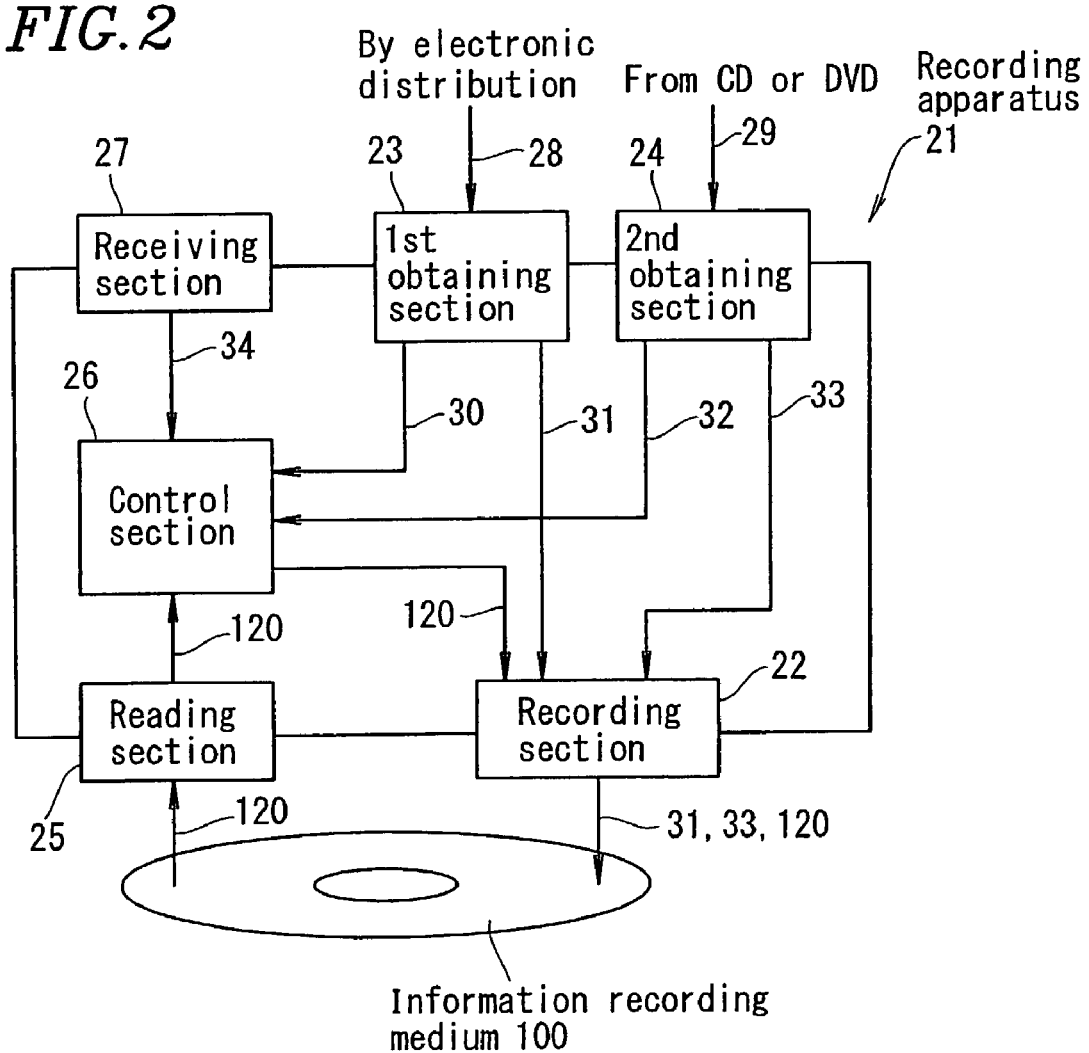

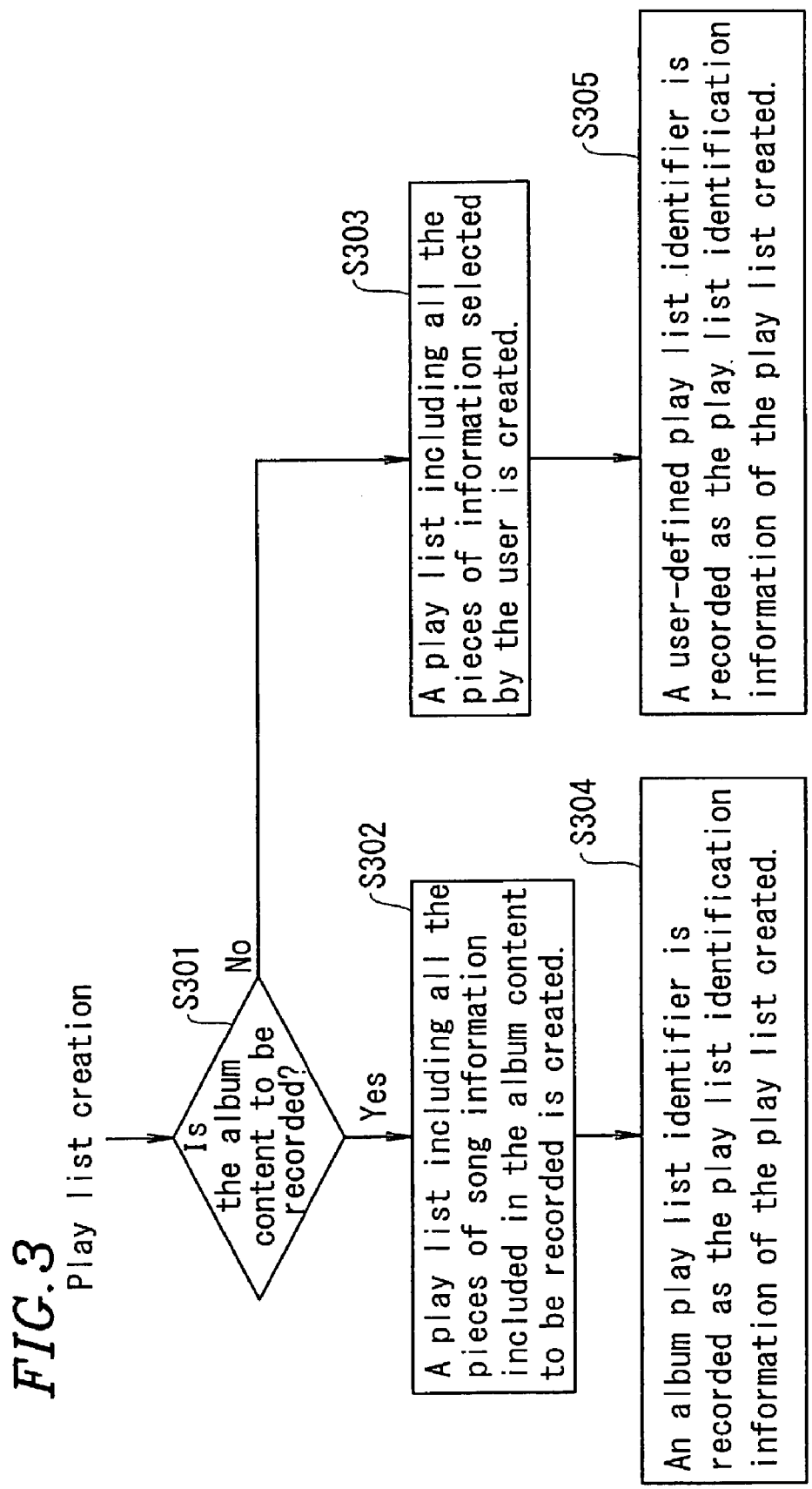
FIG.3 Play list creation

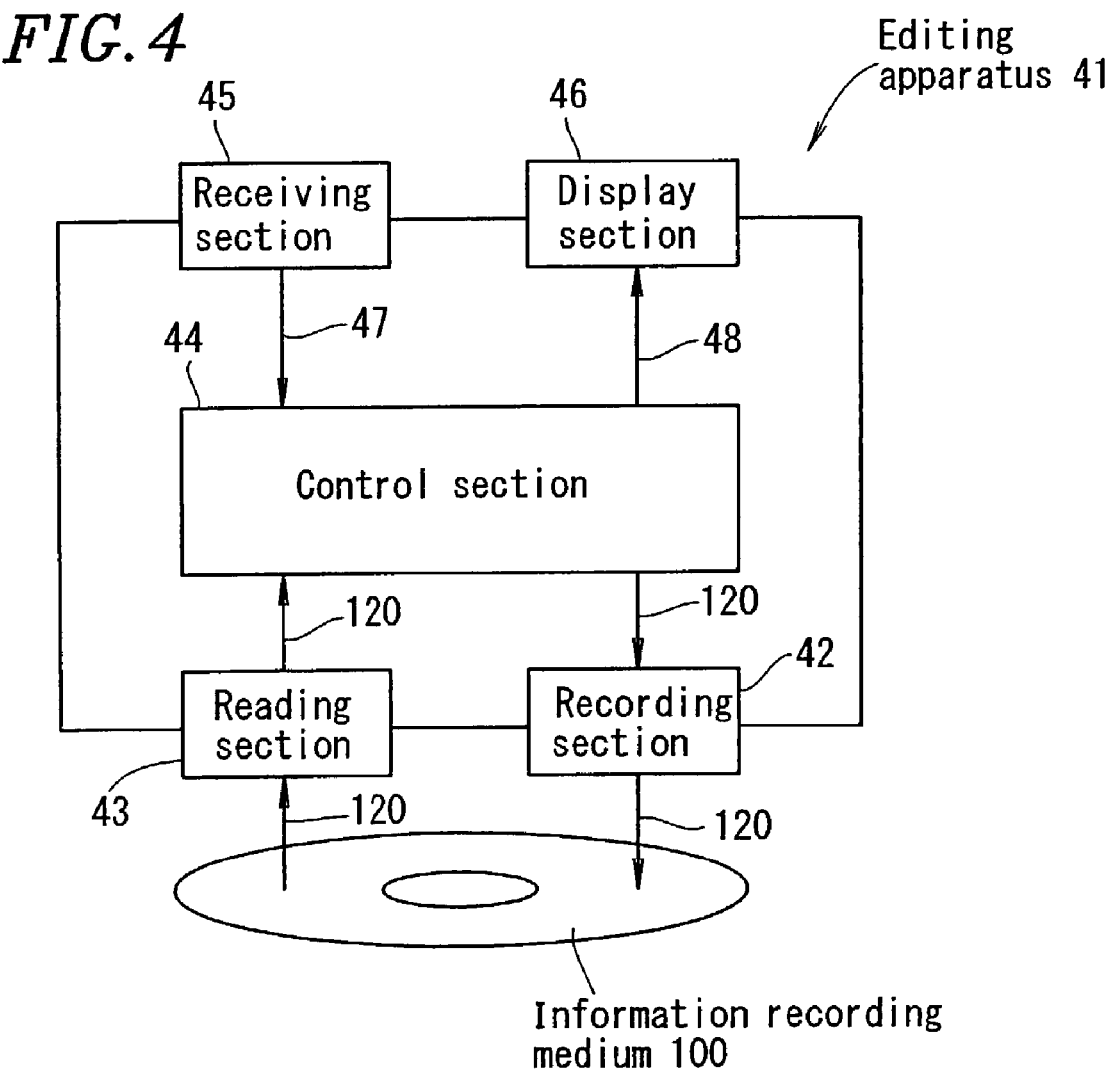

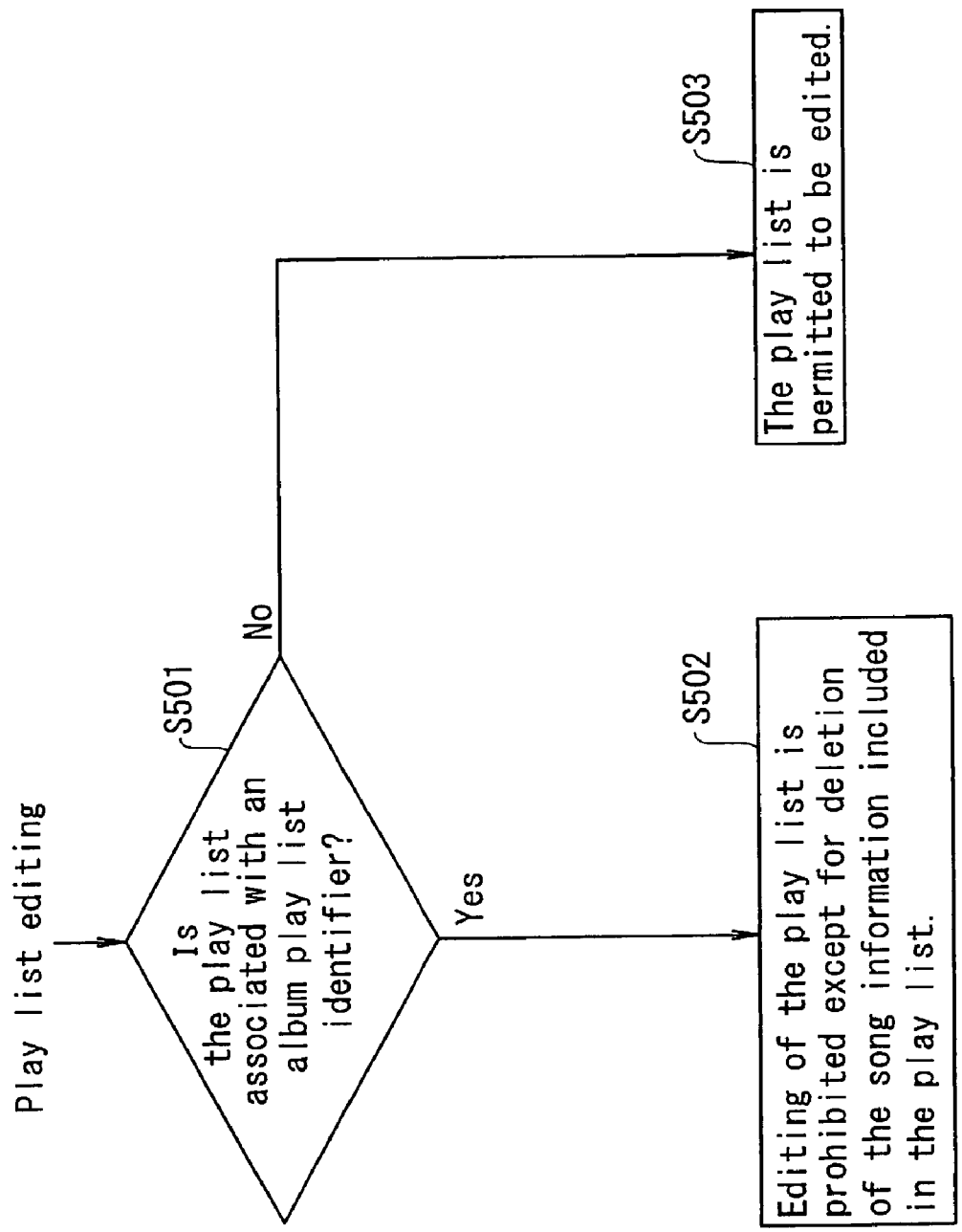

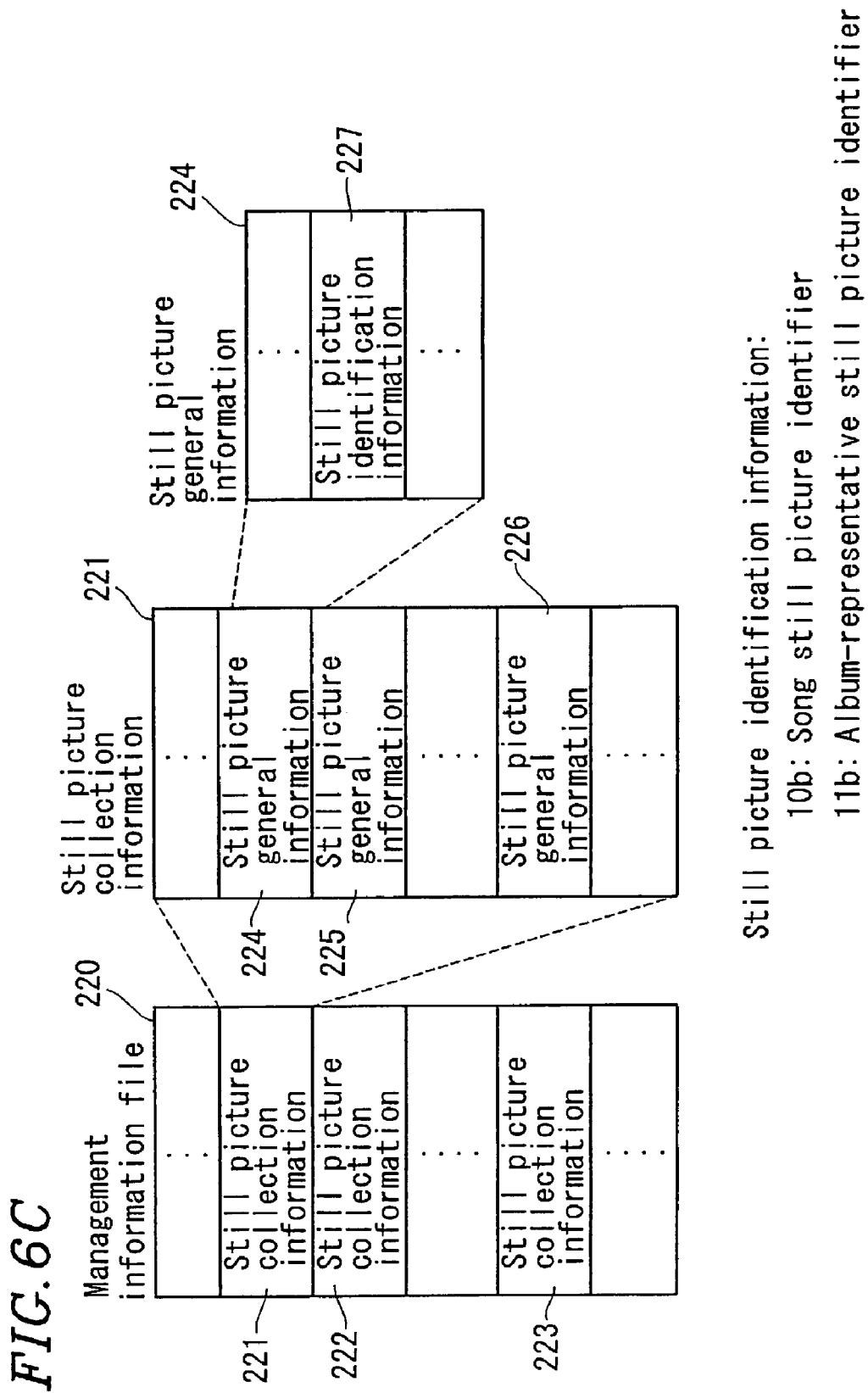

Still picture information recorded on the information recording medium in association with the song information 242

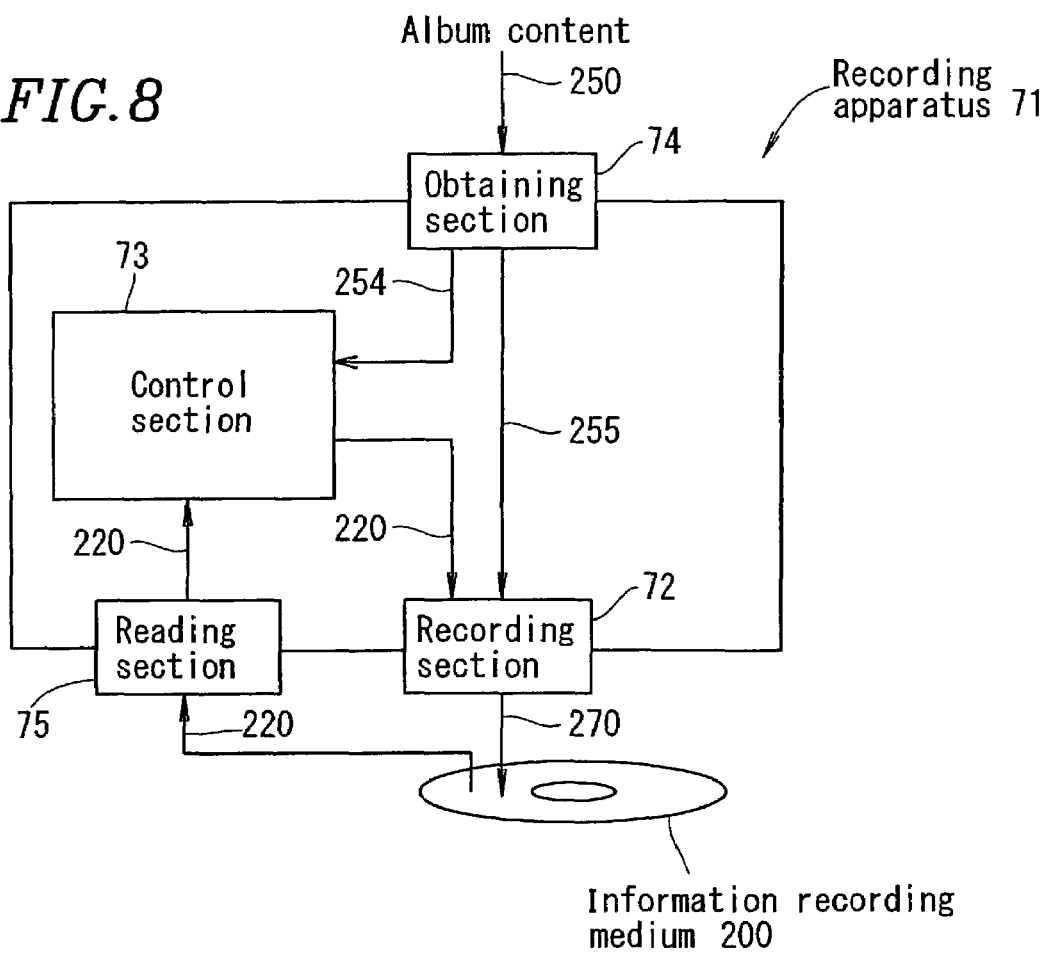

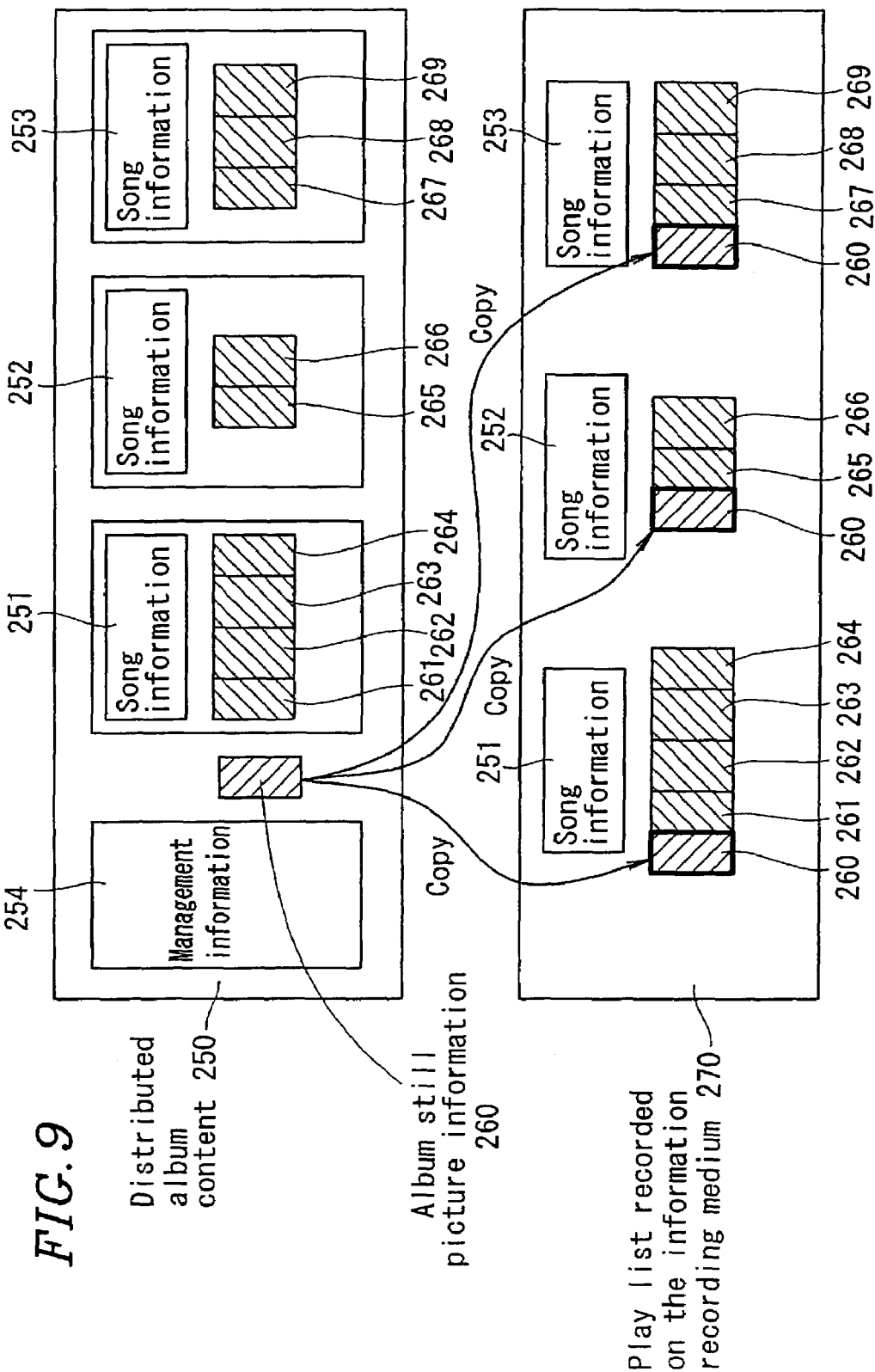

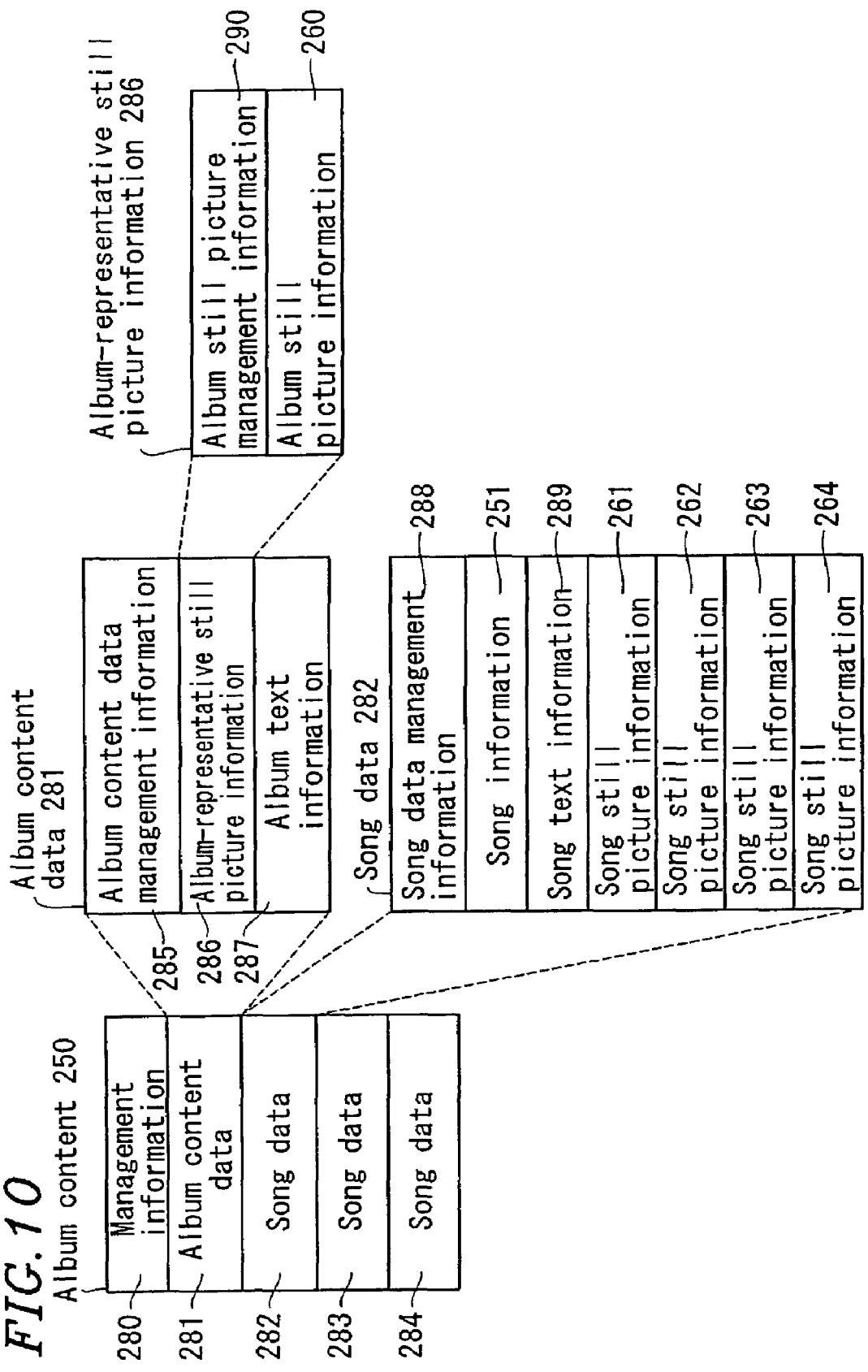

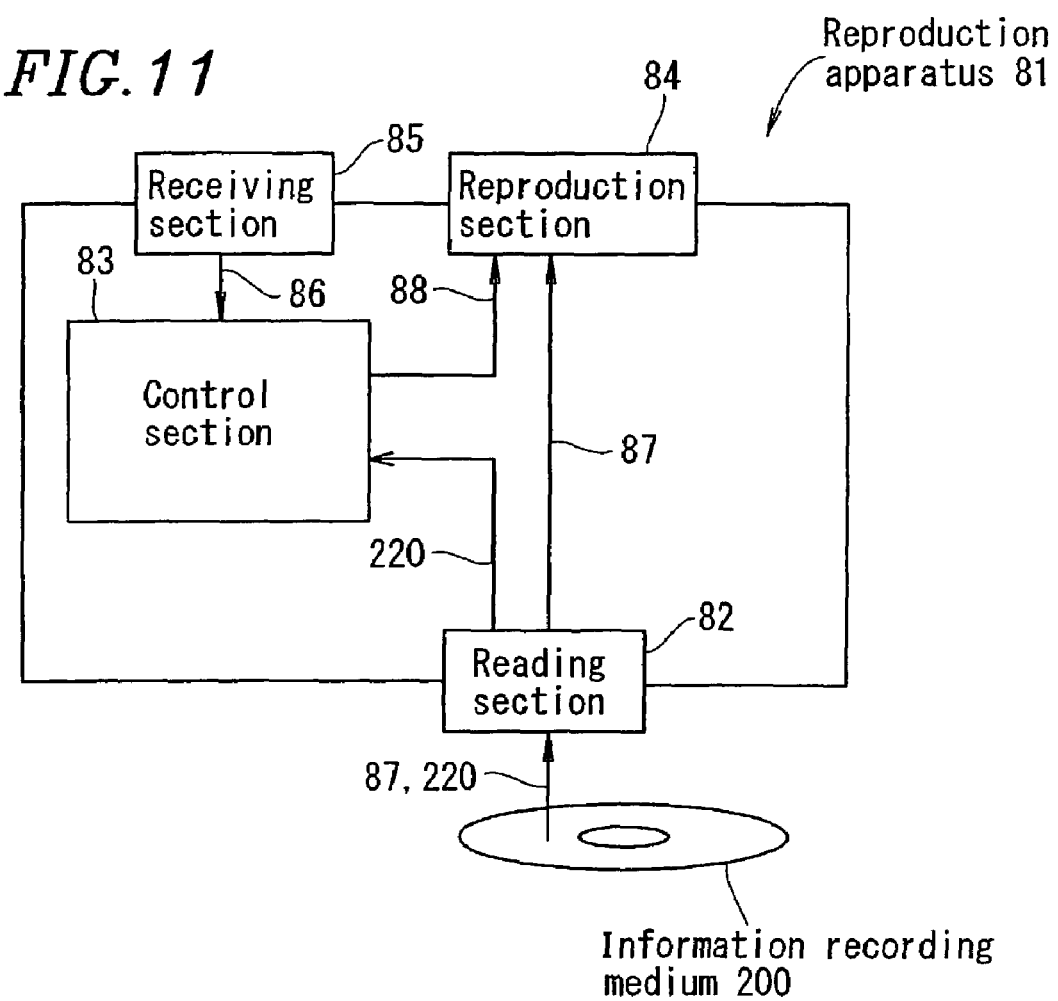

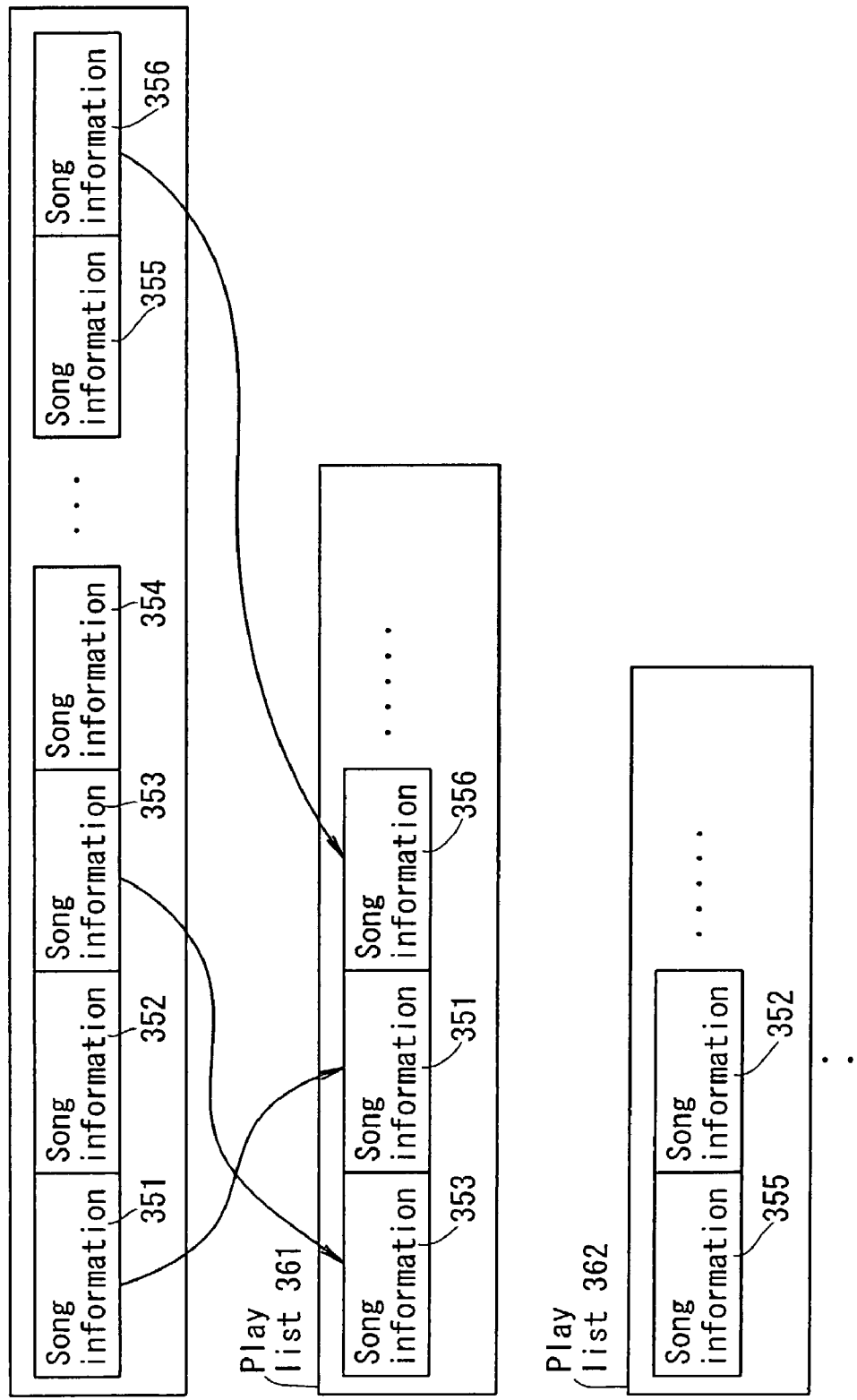

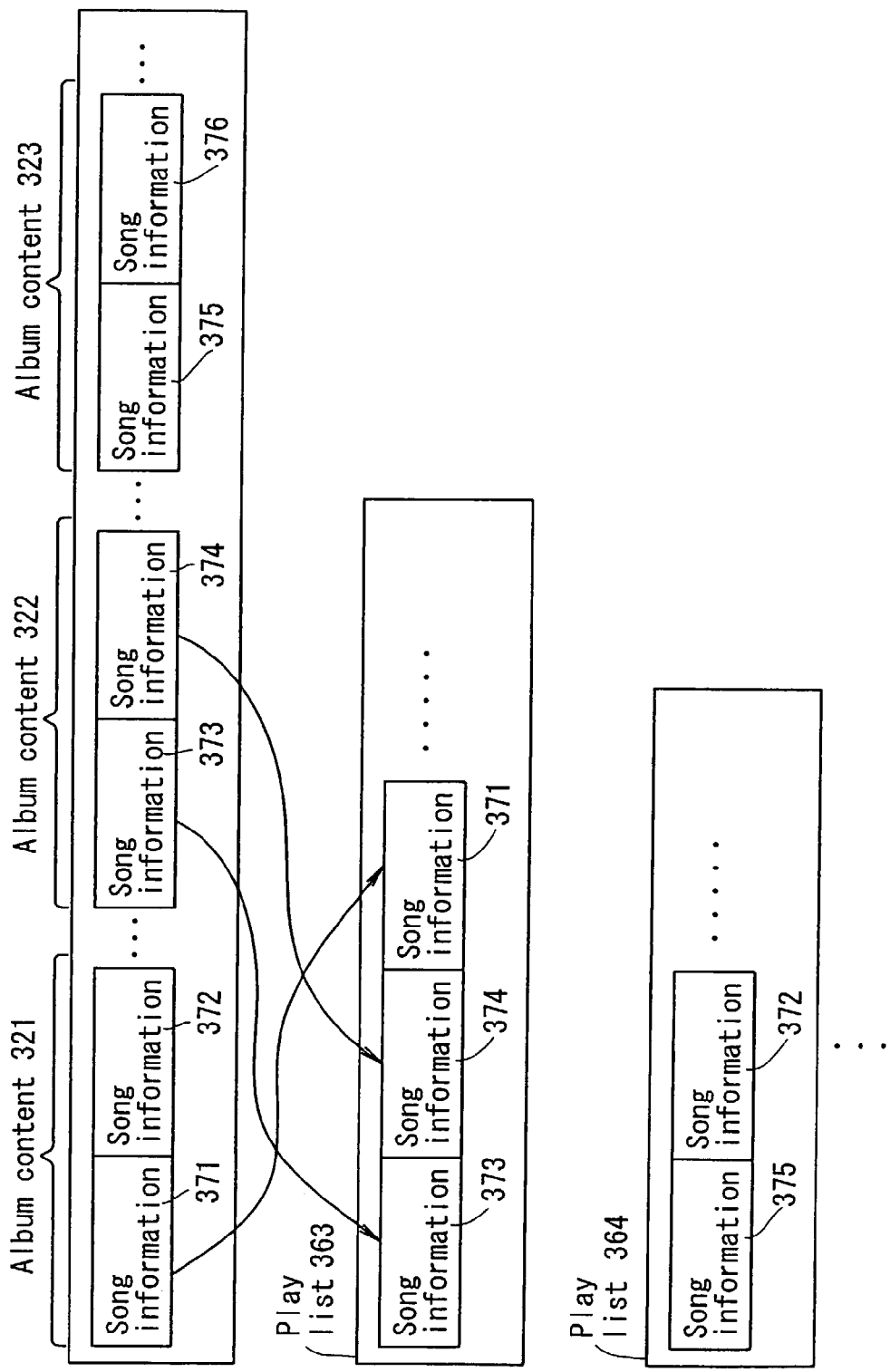

INFORMATION RECORDING MEDIUM, RECORDING APPARATUS, EDITING APPARATUS, REPRODUCTION APPARATUS, RECORDING METHOD, EDITING METHOD, AND REPRODUCTION METHOD

BACKGROUND OF THE INVENTION

1. Field of the Invention

The present invention relates to an information recording medium on which information can be recorded, especially an information recording medium on which at least one of audio information and still picture information can be recorded; and a recording apparatus, an editing apparatus, a reproduction apparatus, a recording method, an editing method, and a reproduction method for use with the information recording medium.

2. Description of the Related Art

With the invention of various types of compression encoding techniques and rapid proliferation of the internet technology, a great number of electronic music distribution systems have recently been introduced into service. Owing to the use of compression encoding techniques such as, for example, MP3, these systems can distribute song information to users within an appropriate length of time, even using a network having narrow bandwidth. Recently, some systems distribute still picture information and/or text information together with the song information as one content. In this specification, the expression "song information" encompasses information representing songs with or without lyrics.

Referring to FIG. 13, it is assumed that a content 300 is distributed including song information 310, three pieces of still picture information 311, 312 and 313, and text information on, for example, a song title and lyrics 314 and 315. On a user's terminal, three still pictures like pages of the booklet contained in, for example, a CD case are displayed one by one while the song information 310 is being reproduced. The song title is displayed in a song menu screen. Such a content is generally recorded on an information recording medium of the user as follows. First, the song information is recorded, and then the still picture information and the text information corresponding to the song information are recorded in association with the recorded song information.

It is expected that an album content including a plurality of such contents will be distributed in the future. Referring to FIG. 14, an album content 320, for example, includes pieces of song information 330 through 332, pieces of still picture information 333 through 340, pieces of text information 342 through 346, album still picture information 347 such as an album jacket which represents the entire album content, and text information 341 which represents an album title or the like. The album still picture information 347 and the text information 341 are used as information to be referred to regarding the album content. For example, the album still picture, the album title and the like are displayed in a menu screen displayed while the album content is being reproduced.

In the case where a great number of pieces of song information are recorded on one information recording medium, the user may create a play list and reproduce his/her favorite pieces of song information in his/her favorite order. As shown in FIG. 15, a play list includes at least one piece of song information selected from a plurality of pieces of song information 351 through 356 recorded on the information recording medium (a play list 361 includes a plurality of pieces of song information 353, 351, and 356), and defines the order of reproduction thereof. When the play list 361 is reproduced, song information 353, song information 351, and song information 356 are reproduced in this order. The user may create another play list, for example, a play list 362 including a plurality of pieces of song information 355 and 352. When creating a plurality of play lists, the user can select the play list he/she wishes to reproduce in accordance with the situation.

It is also possible to reproduce song information from an information recording medium which is different from the information recording medium on which the song information was first recorded. For example, it is possible to first record an album content, recorded on a CD or distributed by electronic distribution, on a DVD-RAM and then record a part of the plurality of pieces of song information selected from the album content on an SD (Secure Digital) memory card. In this case, the user can listen to the songs recorded on the SD memory card away from home. The song information recorded on the DVD-RAM can be recorded on the SD memory card using "transfer" means. "Transfer" refers to copying song information, recorded on an original information recording medium, on another information recording medium and then deleting the copied song information from the original information recording medium. The "transfer" means allows the user to listen to the songs in various places.

Currently, there is a demand for a system for recording and reproducing song information, distributed by an electronic distribution system, by a consumer apparatus. For example, it is conceived to record and reproduce the distributed song information by a consumer-use audio recorder/player. A distributed album content may be recorded on a DVD-RAM. For performing such recording and reproduction, the following information editing and information creation processes are necessary. With the conventional recording formats applied to information recording mediums, it is impossible to perform such information editing and information creation procedures.

An album content which is distributed by electronic distribution is created with a certain creative intention of its distributor regarding the selected pieces of song information and the order of reproduction. Therefore, it is desirable that the user is prohibited from editing the album content, for example, from dividing, combining, and deleting one or more pieces of song information included in the album content and from changing the order of reproduction. Accordingly, when recording a distributed album content on a DVD-RAM, namely, when recording a play list formed of all the pieces of song information in the album content on a DVD-RAM, it is necessary to prohibit the play list from being edited. However, when the user transfers such song information included in the album content to an SD memory card or the like for reproduction, the song information recorded on the DVD-RAM needs to be deleted. In consideration of the "transfer", it is desirable that the editing processing of deleting the song information is not prohibited.

The user may create a play list by selecting arbitrary pieces of song information recorded on an information recording medium such as a DVD-RAM or the like. For the private use of the user, it is desirable not to prohibit the user from editing the created play list, for example, from dividing, combining, and deleting one or more pieces of song information included in the play list, changing the order of reproduction of the pieces of song information, and adding a new piece of song information. In order to appropriately prohibit or permit editing of the play list, it is desirable that the play list is identified as an album content or as including one or more pieces of song information arbitrarily selected by the user.

Referring to FIG. 16, a user may create play lists 363, 364, etc. by selecting arbitrary pieces of information from a plurality of pieces of song information 371 through 376 included in a plurality of album contents 321 through 323. Displaying information indicating which album content includes each of the selected pieces of song information, can provide the user with a new way of enjoying music. Specifically, in the case of the example shown in FIG. 12, it is desirable to display an album still picture of the album content 322 including the song 373 while the song information 373 in the play list 363 is being reproduced, if the user wishes. In order to realize this, when the song information and the still picture information in the album content are recorded on an information recording medium, the album still picture needs to be associated with the song information. In addition, still pictures displayed one by one while the song information is being reproduced need to be distinguished from the album still picture.

SUMMARY OF THE INVENTION

According to one aspect of the invention, an information recording medium is for recording of information, and identification information indicating whether the information is an album content distributed by electronic distribution or information edited by a user.

In one embodiment of the invention, the information is one of audio information, still picture information, moving picture information, and text information.

According to another aspect of the invention, a recording apparatus for recording information on an information recording medium is provided. The information is one of an album content distributed by electronic distribution and information edited by a user. The recording apparatus includes an obtaining section for obtaining the information; a control section for identifying whether the information is an album content distributed by electronic distribution or information edited by a user, and outputting identification information representing the identification result; and a recording section for recording the information and the identification information on the information recording medium.

In one embodiment of the invention, the information is one of audio information, still picture information, moving picture information, and text information.

According to still another aspect of the invention, an editing apparatus for editing information recorded on an information recording medium is provided. The information recording medium has, recorded thereon, identification information which indicates whether the information is an album content distributed by electronic distribution or information edited by a user. The editing apparatus includes a reading section for reading the identification information from the information recording medium; and a control section for identifying whether the information is an album content distributed by electronic distribution or information edited by a user, and editing the information in accordance with a restriction corresponding to the identification result.

In one embodiment of the invention, the information is one of audio information, still picture information, moving picture information, and text information.

According to still another aspect of the invention, an information recording medium is for recording of first information, second information associated with the first information, and identification information which indicates, in an album content originally including the first information and second information, whether the second information is information representative of an entirety of the album content or information associated with the first information.

In one embodiment of the invention, the first information is one of audio information and moving picture information, and the second information is still picture information.

In one embodiment of the invention, the information recording medium is for further recording of third information. The third information is associated with the first information in the album content. The second information is information representative of the entirety of the album content in the album content. A plurality of areas of the information recording medium have respective addresses assigned thereto. An address assigned to an area of the information recording medium in which the second information is to be recorded has a smaller numerical value than that of an address assigned to an area of the information recording medium in which the third information is to be recorded.

In one embodiment of the invention, the first information is one of audio information and moving picture information, and the second information and the third information are still picture information.

According to still another aspect of the invention, a recording apparatus for recording first information and second information on an information recording medium is provided. The first information and the second information are included in an album content, and the second information is one of information representative of an entirety of the album content and information associated with the first information. The recording apparatus includes an obtaining section for obtaining the album content; a control section for identifying whether the second information is the information representative of the entirety of the album content or the information associated with the first information, and outputting identification information representing the identification result; and a recording section for recording the first information, the second information, and the identification information such that the second information is associated with the first information.

In one embodiment of the invention, the first information is one of audio information and moving picture information, and the second information is still picture information.

According to still another aspect of the invention, a reproduction apparatus for reproducing first information and second information associated with the first information which are recorded on an information recording medium is provided. The information recording medium has, recorded thereon, identification information which indicates, in an album content originally including the first information and the second information, whether the second information is information representative of an entirety of the album content or information associated with the first information. The reproduction apparatus includes a reading section for reading the first information, the second information and the identification information from the information recording medium; a reproduction section for reproducing the first information and the second information; and a control section for identifying, in the album content originally including the first information and the second information, whether the second information is information representative of the entirety of the album content or information associated with the first information, and controlling reproduction of the second information performed by the reproduction section based on the identification result.

In one embodiment of the invention, the first information is one of audio information and moving picture information, and the second information is still picture information.

According to still another aspect of the invention, a recording method for recording information on an information recording medium is provided. The information is one of an album content distributed by electronic distribution and information edited by a user. The recording method includes the steps of obtaining the information; identifying whether the information is an album content distributed by electronic distribution or information edited by a user, and outputting identification information representing the identification result; and recording the information and the identification information on the information recording medium.

In one embodiment of the invention, the information is one of audio information, still picture information, moving picture information, and text information.

According to still another aspect of the invention, an editing method for editing information recorded on an information recording medium is provided. The information recording medium has, recorded thereon, identification information which indicates whether the information is an album content distributed by electronic distribution or information edited by a user. The editing method includes the steps of reading the identification information from the information recording medium; and identifying whether the information is an album content distributed by electronic distribution or information edited by a user, and editing the information in accordance with a restriction corresponding to the identification result.

In one embodiment of the invention, the information is one of audio information, still picture information, moving picture information, and text information.

According to still another aspect of the invention, a recording method for recording first information and second information on an information recording medium is provided. The first information and the second information are included in an album content, and the second information is one of information representative of an entirety of the album content and information associated with the first information. The recording method includes the steps of obtaining the album content; identifying whether the second information is the information representative of the entirety of the album content or the information associated with the first information, and outputting identification information representing the identification result; and recording the first information, the second information, and the identification information such that the second information is associated with the first information.

In one embodiment of the invention, the first information is one of audio information and moving picture information, and the second information is still picture information.

According to still another aspect of the invention, a reproduction method for reproducing first information and second information associated with the first information which are recorded on an information recording medium is provided. The information recording medium has, recorded thereon, identification information which indicates, in an album content originally including the first information and the second information, whether the second information is information representative of an entirety of the album content or information associated with the first information. The reproduction method includes the steps of reading the first information, the second information and the identification information from the information recording medium; reproducing the first information and the second information; and identifying, in the album content originally including the first information and the second information, whether the second information is information representative of the entirety of the album content or information associated with the first information, and controlling reproduction of the second information based on the identification result.

In one embodiment of the invention, the first information is one of audio information and moving picture information, and the second information is still picture information.

Thus, the invention described herein makes possible the advantages of providing an information recording medium including information which indicates whether a play list is an album content or information including one or more pieces of song information arbitrarily selected by the user, or indicates whether still picture information associated with song information is still picture information to be displayed while the song information is being reproduced, or is an album still picture information; and a recording apparatus, an editing apparatus, a reproduction apparatus, a recording method, an editing method and a reproduction method for use with such an information recording medium.

These and other advantages of the present invention will become apparent to those skilled in the art upon reading and understanding the following detailed description with reference to the accompanying figures.

BRIEF DESCRIPTION OF THE DRAWINGS

FIG. 1C shows a management information file according to the first example;

FIG. 2 shows a recording apparatus according to the first example;

FIG. 3 is a flowchart illustrating a play list creation procedure according to the first example;

FIG. 4 shows an editing apparatus according to the first example;

FIG. 5 is a flowchart illustrating a play list editing procedure;

FIG. 6C shows a management information file according to the second example;

FIG. 8 shows a recording apparatus according to the second example;

FIG. 9 shows an album content and a play list according to the second example;

FIG. 10 shows a data structure of an album content according to the second example;

FIG. 11 shows a reproduction apparatus according to the second example;

FIG. 15 shows a created play list; and

FIG. 16 shows a created play list.

DESCRIPTION OF THE PREFERRED EMBODIMENTS

Hereinafter, the present invention will be described by way of illustrative examples with reference to the accompanying drawings.

EXAMPLE 1

An information recording medium according to a first example of the present invention is an information recording medium for recording of the following types of information: at least one of audio information, still picture information, moving picture information and text data; as well as identification information which indicates whether the at least one information is an album content distributed by electronic distribution or is information edited by the user. The audio information represents sound, and includes, for example, song information and voice information. One piece of song information represents one song, and one piece of still picture information represents one still picture.

Figure 1A:
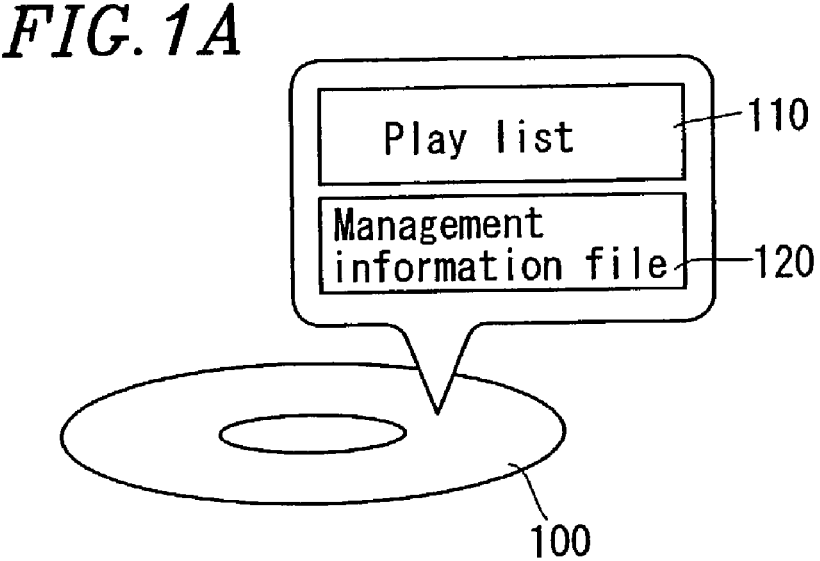
FIG. 1A shows an information recording medium according to a first example of the present invention.
Figure 1B:
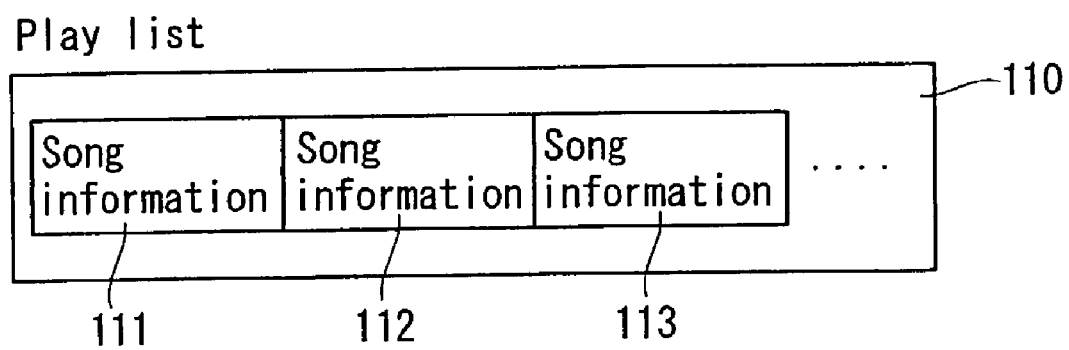
FIG. 1B shows a play list according to the first example.

FIG. 1A shows an information recording medium 100 as an exemplary information recording medium according to the first example. The information recording medium 100 includes a play list 110 which is audio information including at least one piece of song information, and a management information file 120 for managing the play list 110. As shown in FIG. 1B, the play list 110 includes a plurality of pieces of information 111, 112 and 113. The order of reproduction of the plurality of pieces of information 111, 112 and 113 may be determined by, for example, the order in which the plurality of pieces of information 111, 112 and 113 are recorded.

As shown in FIG. 1C, the management information file 120 includes play list information 121 representing information on the play list 110. In the case where the information recording medium 100 includes further play lists, the management information file 120 includes further pieces of play list information (for example, play list information 122 and 123 shown in FIG. 1C).

The play list information 121 includes play list general information 124 representing general information on the play list 110, for example, the number of pieces of song information included in the play list 110. The play list general information 124 includes play list identification information 125 for identifying the type of the play list 110. The play list identification information 125 indicates whether the play list 110 is an album content distributed by electronic distribution or is information edited by the user. The album content distributed by electronic distribution is an album including a plurality of contents. A "content" is, for example, song information, still picture information, moving picture information, or text information. Herein, the content is song information. A plurality of pieces of song information included in the album content, the order of reproduction thereof, and the like reflect the intention of its copyright holder. The album content is recorded on the information recording medium 100 so as to reflect the intention of the copyright holder. The information edited by the user is a play list created by the user by combining a plurality of pieces of song information recorded on one or more information recording mediums which are information sources other than the electronic distribution. Such a play list edited by the user will be referred to as a "user-defined play list". The album content and the user-defined play list may each be information including only one piece of song information. The play list identification information 125 is either an album play list identifier indicating that the play list 110 is an album content distributed by electronic distribution, or a user-defined play list identifier indicating that the play list 110 is a user-defined play list.

Referring to FIG. 2, a recording apparatus 21 for recording the play list 110 and the play list identification information 125 as described above on the information recording medium 100 will be described. The recording apparatus 21 includes a first obtaining section 23 for obtaining an album content 28 by electronic distribution via a network system such as the Internet or the like, a second obtaining section 24 for obtaining a song and management information set 29 (described below) from an information source other than electronic distribution (for example, a CD or a DVD), a reading section 25 for reading information from the information recording medium 100, a control section 26, a receiving section 27 for receiving an instruction from the user regarding the type of editing to be performed, and a recording section 22 for recording information on the information recording medium 100. The song and management information set 29 is formed of a set 33 of a plurality of pieces of song information, and management information 32. The control section 26 identifies the information obtained by the first obtaining section 23 as the album content 28, and identifies the information obtained by the second obtaining section 24 as information edited by the user.

The album content 28 obtained by the first obtaining section 23 by electronic distribution includes a set 31 of a plurality of pieces of song information and management information 30. Upon obtaining the album content 28, the first obtaining section 23 outputs the management information 30 included in the album content 28 to the control section 26, and outputs the set 31 of all the pieces of song information included in the album content 28 to the recording section 22.

The control section 26 analyses the management information 30 and creates new play list information including an album play list identifier such that the set 31 is recorded on the information recording medium 100 as one play list. In the case where the information recording medium 100 has the management information file 120 (FIG. 1C) already stored thereon, the control section 26 obtains the management information file 120 from the information recording medium 100 via the reading section 25, and updates the management information file 120 such that the file 120 includes the newly created play list information. In the case where the information recording medium 100 has no management information file 120, the control section 26 creates management information file 120 including the newly created play list information. Then, the control section 26 outputs the updated or created management information file 120 to the recording section 22. The recording section 22 records the updated or created management information file 120 and the set 31 on the information recording medium 100.

Upon obtaining the set 29 of the plurality of pieces of song information and the management information 32 from the information source, the second obtaining section 24 outputs the management information 32 included in the set 29 to the control section 26, and outputs the set 33 of all the pieces of song information included in the set 29 to the recording section 22.

The control section 26 analyzes the management information 32 and creates new play list information including a user-defined play list identifier such that the set 33 is recorded on the information recording medium 100 as one play list. In the case where the information recording medium 100 has the management information file 120 (FIG. 1C) already stored thereon, the control section 26 obtains the management information file 120 from the information recording medium 100 via the reading section 25, and updates the management information file 120 such that the file 120 includes the newly created play list information. In the case where the information recording medium 100 has no management information file 120, the control section 26 creates management information file 120 including the newly created play list information. Then, the control section 26 outputs the updated or created management information file 120 to the recording section 22. The recording section 22 records the updated or created management information file 120 and the set 33 on the information recording medium 100.

The recording apparatus 21 operates as follows. The receiving section 27 receives editing instruction information 34 from the user to select a plurality of pieces of song information from the information recorded on the information recording medium 100 and record a new play list including the plurality of selected pieces of song information on the information recording medium 100. Then, the receiving section 27 outputs the editing instruction information 34 to the control section 26. The "editing instruction information" includes, for example, an instruction to create a new play list and an instruction on song numbers of the pieces of song information to be included in the new play list. Upon receiving the editing instruction information 34, the control section 26 creates new play list information representing information on a new play list including the plurality of pieces of song information selected by the user. The new play list information includes a user-defined play list identifier. The control section 26 obtains the management information file 120 from the information recording medium 100 via the reading section 25, and updates the management information file 120 such that the file 120 includes the newly created play list information. Then, the control section 26 outputs the updated management information file 120 to the recording section 22. The recording section 22 records the updated management information file 120 on the information recording medium 100.

FIG. 3 is a flowchart illustrating a procedure for creating a play list performed by the recording apparatus 21. When the album content obtained by electronic distribution is to be recorded on the information recording medium 100 ("Yes" in step S301), one play list including all the plurality of pieces of song information included in the album content is created (step S302), and the album play list identifier is recorded on the information recording medium 100 as the play list identifier for the play list (step S304). When the user-defined play list is to be recorded on the information recording medium 100 ("No" in step S301), one play list including all the pieces of the information selected by the user is created (step S303), and the user-defined play list identifier is recorded on the information recording medium 100 as the play list identifier for the play list (step S305).

The play list associated with the album play list identifier is prohibited from being edited except for deletion of each piece of song information. The album play list identifier basically represents an album content protected by the copyright of the content creator. The album content is created with a certain creative intention of the content creator regarding the selected pieces of song information and the order of reproduction. Therefore, the play list associated with the album play list identifier needs to be prohibited from being edited. However, the user may wish to listen to the songs in the state of being recorded on another information recording medium using the "transfer" means. Listening to the songs on various information recording mediums using the "transfer" means is one important way of enjoying music for the user. For example, the user may transfer a plurality of pieces of song information from the DVD-RAM at home to an SD memory card in order to listen to the songs on his/her way to school or work. When a piece of song information included in the play list associated with the album play list identifier is transferred from one information recording medium to another, the piece of song information, after being copied, needs to be deleted from the information recording medium originally storing that piece of song information. In this case, the piece of song information in the play list needs to be permitted to be deleted even when the play list is included in the album content. In the case of the play list associated with the user-defined play list identifier, it is permitted to edit the play list, for example, to divide, combine, and delete the pieces of song information, to change the order of the pieces of song information, and to add a new piece of song information.

Referring to FIG. 4, an editing apparatus 41 for editing the play list as described above based on the play list identification information will be described. The editing apparatus 41 includes a reading section 43 for reading information from the information recording medium 100, a control section 44 for controlling the editing processing, a recording section 42 for recording information on the information recording medium 100, a receiving section 45 for receiving an instruction from the user on the type of editing, and a display section 46 for displaying a message to the user.

The editing apparatus 41 operates as follows. The receiving section 45 receives editing instruction information 47 from the user to edit the play list recorded on the information recording medium 100. The editing instruction information 47 includes, for example, the play list number of the play list to be edited, and the type of editing, for example, deletion of a piece of song information from the play list. The receiving section 45 outputs the editing instruction information 47 to the control section 44. Next, the reading section 43 reads the management information file 120 from the information recording medium 100 and outputs the management information file 120 to the control section 44.

The control section 44 retrieves play list information associated with the play list number represented by the editing instruction information 47 from the management information file 120. The control section 44 identifies whether the play list identification information included in the retrieved play list information is an album play list identifier or is a user-defined play list identifier. The control section 44 edits the play list in accordance with the restriction corresponding to the identification result.

When the play list information is identified as an album play list identifier, and further the editing instruction information 47 instructs editing processing other than deletion of one or more pieces of song information included in the play list, the control section 44 prohibits the editing. The control section 44 outputs editing prohibition information 48 indicating that the editing is prohibited to the display section 46, and the display section 46 displays alarm information indicating that the editing is impossible. When the editing instruction information 47 instructs deletion of one or more pieces of song information included in the play list, the control section 44 updates the management information file 120 such that the piece(s) of song information represented by the editing instruction information 47 is (are) deleted. Then, the control section 44 outputs the updated management information file 120 to the recording section 42. The recording section 42 records the updated management information file 120 on the information recording medium 100. Concurrently, the recording section 42 deletes the piece(s) of song information represented by the editing instruction information 47 from the information recording medium 100.

When the play list information is identified as a user-defined play list identifier, the control section 44 updates the management information file 120 such that the editing result instructed by the editing instruction information 47 is obtained. The control section 44 outputs the updated management information file 120 to the recording section 42. The recording section 42 records the updated management information file 120 on the information recording medium 100. When necessary, the control section 44 reads the play list to be edited from the information recording medium 100 via the reading section 43, and edits the read play list. The control section 44 outputs the edited play list to the recording section 42, and the recording section 42 records the edited play list on the information recording medium 100.

FIG. 5 is a flowchart illustrating a procedure for editing a play list performed by the editing apparatus 41. In step S501, it is determined whether the play list is associated with an album play list identifier or with a user-defined play list identifier. When the play list is determined to be associated with the album play list identifier ("Yes" in step S501), editing of the play list is prohibited except for deletion of one or more pieces of song information from the play list (step S502). When the play list is determined to be associated with the user-defined play list identifier ("No" in step S501), various types of editing (for example, division and combination of a plurality of pieces of song information, deletion of one or more pieces of song information, change of the order of the plurality of pieces of song information, and addition of a new piece of song information) are permitted (step S503). In this manner, the play list is edited in accordance with the restriction corresponding to the type of the play list. The editing apparatus 41 may be built into a recording apparatus (for example, the recording apparatus 21 shown in FIG. 2).

According to the first example, the type of each play list is identified, and therefore, copyright management can be performed in different manners for different types of play lists. For example, for a play list associated with an album play list identifier, editing other than deletion of one or more pieces of song information included in the play list is prohibited. A play list associated with a user-defined play list identifier can be edited in various manners.

EXAMPLE 2

An information recording medium according to a second example of the present invention is an information recording medium for recording of the following types of information: first information, second information associated with the first information, and identification information for identifying the type of the second information. More specifically, the identification information indicates, in an album content originally including the first information and the second information, whether the second information is information representative of the entire album content or is information originally associated with the first information. The first information is either one of audio information and moving picture information, and the second information is either one of the still picture information and text data. In this example, the audio information is song information.

Figure 6A:
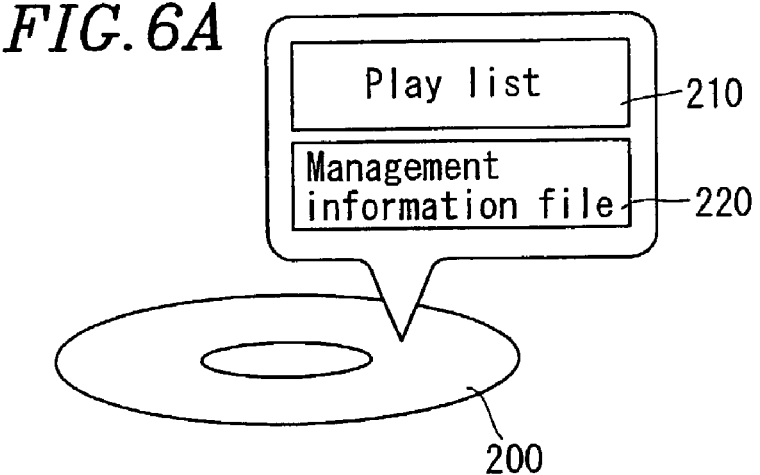
FIG. 6A shows an information recording medium according to a second example of the present invention.
Figure 6B:
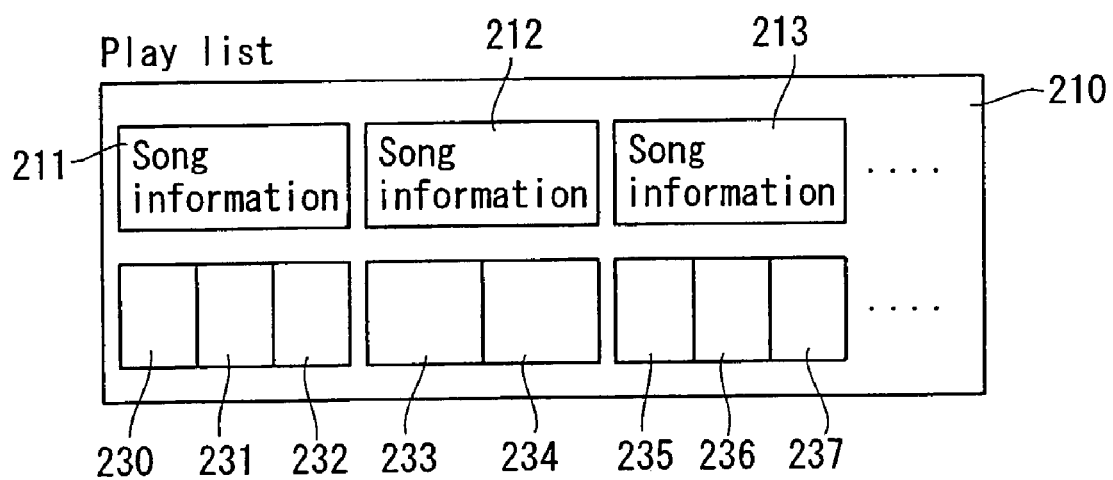
FIG. 6B shows a play list according to the second example.

FIG. 6A shows an information recording medium 200 as an exemplary information recording medium according to the second example. The information recording medium 200 includes a play list 210 including at least one piece of song information, and a management information file 220 for managing the play list 210. As shown in FIG. 6B, the play list 210 includes, for example, a plurality of pieces of song information 211, 212 and 213, a plurality of pieces of still picture information 230, 231 and 232 associated with the song information 211, a plurality of pieces of still picture information 233 and 234 associated with the song information 212, and a plurality of pieces of still picture information 235, 236 and 237 associated with the song information 213.

The management information file 220, like the management information file 120 shown in FIG. 1C, includes play list information (not shown) representing information on the play list 210. As shown in FIG. 6C, the management information file 220 further includes still picture collection information 221 representing information on the pieces of still picture information 230, 231 and 232 associated with the song information 211. In the case where the information recording medium 200 includes further pieces of song information, the management information file 220 includes further pieces of still picture collection information (for example, still picture collection information 222 and 223). Each piece of still picture collection information may be included in one piece of play list information.

Each piece of still picture collection information includes information on one or more pieces of still picture information associated with one piece of song information. The still picture collection information 221 includes still picture general information 224 representing information on the still picture information 230. The still picture collection information 221 also includes still picture general information representing information on other pieces of still picture information (for example, still picture general information 225 and 226). The still picture general information 224 includes still picture identification information 227 for specifying the purpose of use of the still picture represented by the still picture information 230. The still picture identification information 227 indicates, in an album content originally including the song information 211 and the still picture information 230 (i.e., the album content which is a source of the song information 211 and the still picture information 230),whether the still picture information 230 is still picture information representative of the entire album content or is still picture information associated with the song information 211. In the album content, the still picture information representative of the entire album content is displayed as reference information together with, for example, the order of reproduction of the plurality of pieces of song information included in the album content. The still picture information associated with the song information is displayed while the associated song information is being reproduced. The still picture identification information 227 is, in the album content originally including the song information 211 and the still picture information 230, an album-representative still picture identifier which indicates that the still picture information 230 represents the entire album content, or a song still picture identifier which indicates that the still picture information 230 is associated with the song information 211. Hereinafter, the still picture information representative of the entire album content originally including the song information 211 and the still picture information 230 will be referred to as "album still picture information", and the still picture information associated with the song information in the album content will be referred to as "song still picture information".

Figure 7A:
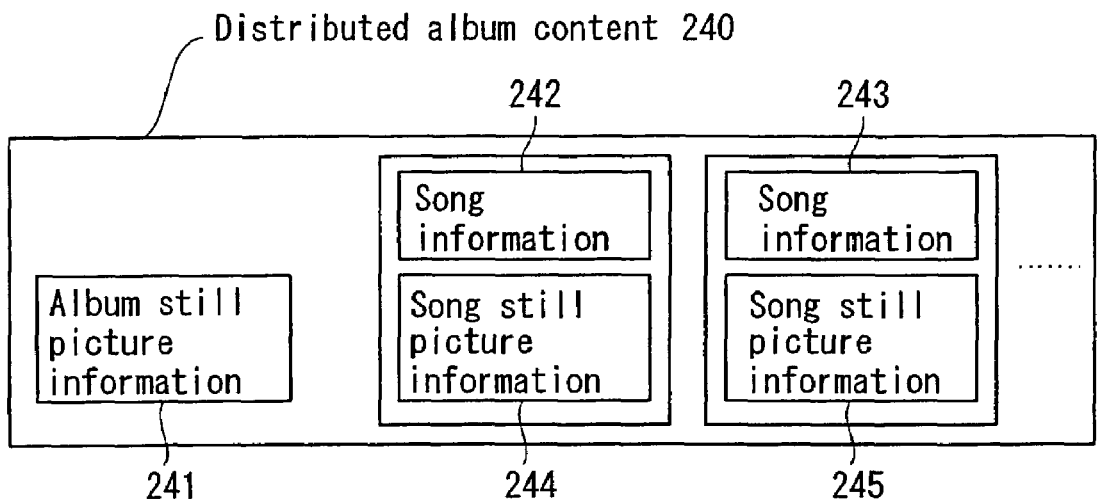
FIG. 7A shows an album content according to the second example.
Figure 7B:
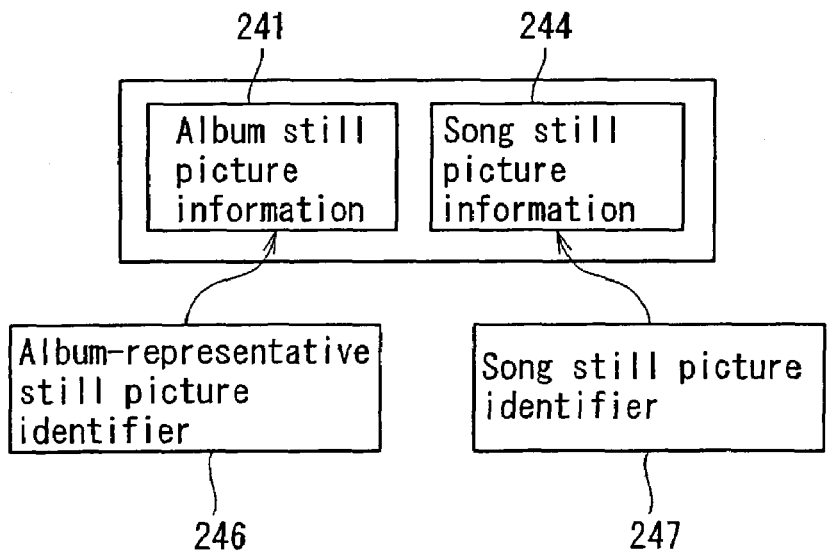
FIG. 7B shows still picture information according to the second example.

FIG. 7A shows a structure of an album content 240 as an exemplary album content distributed by electronic distribution. The album content 240 includes album still picture information 241 representative of the entire album content, such as an album jacket or the like, a plurality of pieces of song information 242 and 243, song still picture information 244 associated with the song information 242, and song still picture information 245 associated with the song information 243. Referring to FIG. 7B, the album content 240 is recorded on the information recording medium 200 as follows. The album still picture information 241 and the song still picture information 244 are first recorded on the information recording medium 200 as still picture information associated with one piece of song information 242. Then, an album-representative still picture identifier 246 is recorded on the information recording medium 200 in association with, and as the still picture identification information of, the album still picture information 241. A song still picture identifier 247 is recorded on the information recording medium 200 in association with, and as the still picture identification information of, the song still picture information 244. Thus, the user can combine a plurality of pieces of song information arbitrarily selected from a plurality of album contents to create one play list. Even while a song in the play list is being reproduced, the album still picture of the album content originally including the song information can be displayed.

FIG. 8 shows a recording apparatus 71 for recording an album content, including song information, one or more pieces of song still picture information associated with the song information, and album still picture information, on the information recording medium 200. The recording apparatus 71 includes a recording section 72, a control section 73, an obtaining section 74, and a reading section 75.

The recording apparatus 71 records an album content 250 shown in FIG. 9 on the information recording medium 200 as follows. The album content 250 includes a plurality of pieces of song information 251, 252 and 253, a plurality of pieces of song still picture information 261, 262, 263 and 264 associated with the song information 251, a plurality of pieces of song still picture information 265 and 266 associated with the song information 252, a plurality of pieces of song still picture information 267, 268 and 269 associated with the song information 253, album still picture information 260, and management information 254 representing information on reproduction of the album content 250.

Upon obtaining the album content 250, the obtaining section 74 outputs the management information 254 to the control section 73, and outputs a content 255 included in the album content 250 (i.e., the plurality of pieces of song information 251 through 253, the album still picture information 260, and the plurality of pieces of song still picture information 261 through 269) to the recording section 72.

The control section 73 analyzes the management information 254. When the information obtained by the obtaining section 74 is identified as the album content 250, the control section 73 creates new play list information including the album play list identifier such that the content 255 is recorded on the information recording medium 200 as one play list 270.

In the case where the information recording medium 200 has the management information file 220 (FIG. 6C) already stored thereon, the control section 73 obtains the management information file 220 from the information recording medium 200 via the reading section 75, and updates the management information file 220 such that the file 220 includes the newly created play list information. In the case where the information recording medium 200 has no management information file 220, the control section 73 creates management information file 220 including the newly created play list information. Then, the control section 73 outputs the updated or created management information file 220 to the recording section 72. The recording section 72 records the updated or created management information file 220 and the play list 270 including the content 255 on the information recording medium 200.

The updated or created management information file 220 includes still picture identification information on each of the album still picture information 260 and the plurality of pieces of song still picture information 261 through 269. The still picture identification information is obtained based on the identification result of the control section 73 as described below. Before the management information file 220 is updated or created, the control section 73 analyzes the management information 254 and identifies whether each piece of still picture information included in the album content is song still picture information associated with a piece of song information or is album still picture information. After the identification, the control section 73 associates each piece of song still picture information 261 through 269 with a song still picture identifier, and updates or creates the management information file 220 such that each piece of song still picture information 261 through 269 is associated with the song information originally associated therewith. The control section 73 records the management information file 220 on the information recording medium 200. The song still picture information associated with a song still picture identifier is displayed while the associated song information is being reproduced.

In addition, as shown in FIG. 9, the control section 73 copies the album still picture information 260, and associates the copied album still picture 260 with each piece of song information 251, 252 and 253. Then, the control section 73 updates or creates the management information file 220 such that the copied album still picture information 260 is associated with the album-representative still picture identifier, and records the updated or created management information file 220 on the information recording medium 200.

FIG. 10 shows an exemplary data structure of the album content 250 distributed by electronic distribution. The album content 250 is formed of one file. The album content 250 includes management information 280 for managing the entire album content 250, album content data 281 including a content on the entire album, and a plurality of pieces of song data 282, 283 and 284 as information on the plurality of pieces of song information. The album content data represents, for example, the name of the album content, the name of the artist, a jacket still picture, liner notes or the like. The song data represents, for example, the song, a still picture associated with the song, the title of the song, or the like.

The album content data 281 includes album content management data 285 for managing the album content data 281, album-representative still picture information 286, and album text information 287. The album-representative still picture information 286 includes album still picture management information 290 for managing the album-representative still picture information 286 and the album still picture information 260 representing the still picture representative of the entire album. The album still picture information 260 shows a jacket still picture or the like, and the album text information 287 represents the name of the album content, liner notes or the like.

The song data 282 includes the song information 251 and information associated with the song information 251. The song data 283 includes the song information 252 and information associated with the song information 252. The song data 284 includes the song information 253 and information associated with the song information 253. The song data 282 will be described in more detail. The song data 282 includes song data management information 288 for managing the song data 282, the song information 251, song text information 289 associated with the song information 251, and the plurality of pieces of song still picture information 261, 262, 263 and 264. The song text information 289 represents the title of the song or the like.

The combination of the management information 280, the album content data management information 285, the song data management information 288, and the album still picture management information 290 corresponds to the management information 254 shown in FIG. 9. The control section 73 analyses the management information 254 and identifies whether each piece of still picture information included in the album content is song still picture information associated with one piece of song information, or is album still picture information. As shown in FIG. 10, the song still picture information and the album still picture information are included in different areas in the data structure of the album content 250. Owing to such a structure, the control section 73 can distinguish the song still picture information from the album still picture information.

FIG. 11 show a reproduction apparatus 81 for reproducing the song still picture information and the album still picture information. The reproduction apparatus 81 includes a reading section 82 for reading information from the information recording medium 200, a control section 83, a reproduction section 84 for reproducing song information and displaying still picture information, and receiving section 85 for receiving instruction information from the user. The reproduction section 84 includes, for example, a speaker and a monitor.

Figure 12:
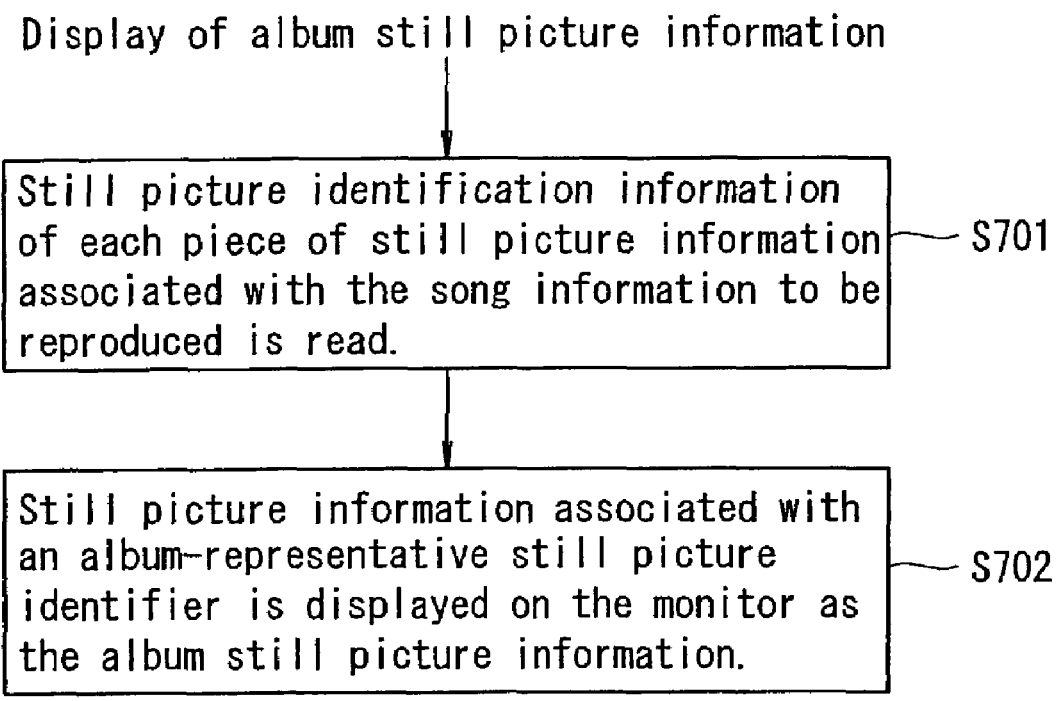
FIG. 12 is a flowchart illustrating a still picture information display procedure.
Figure 13:
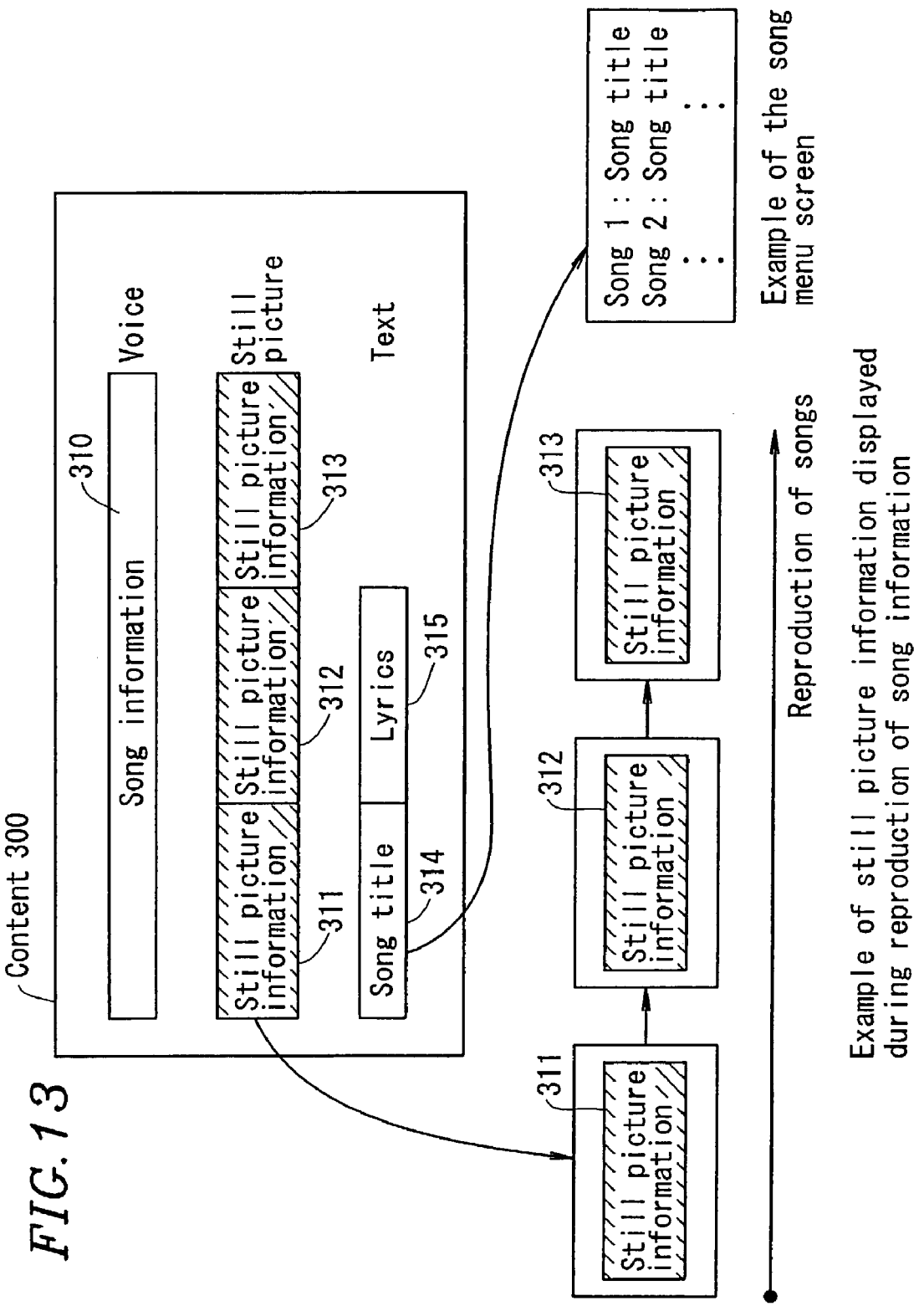
FIG. 13 shows a distributed content.
Figure 14:
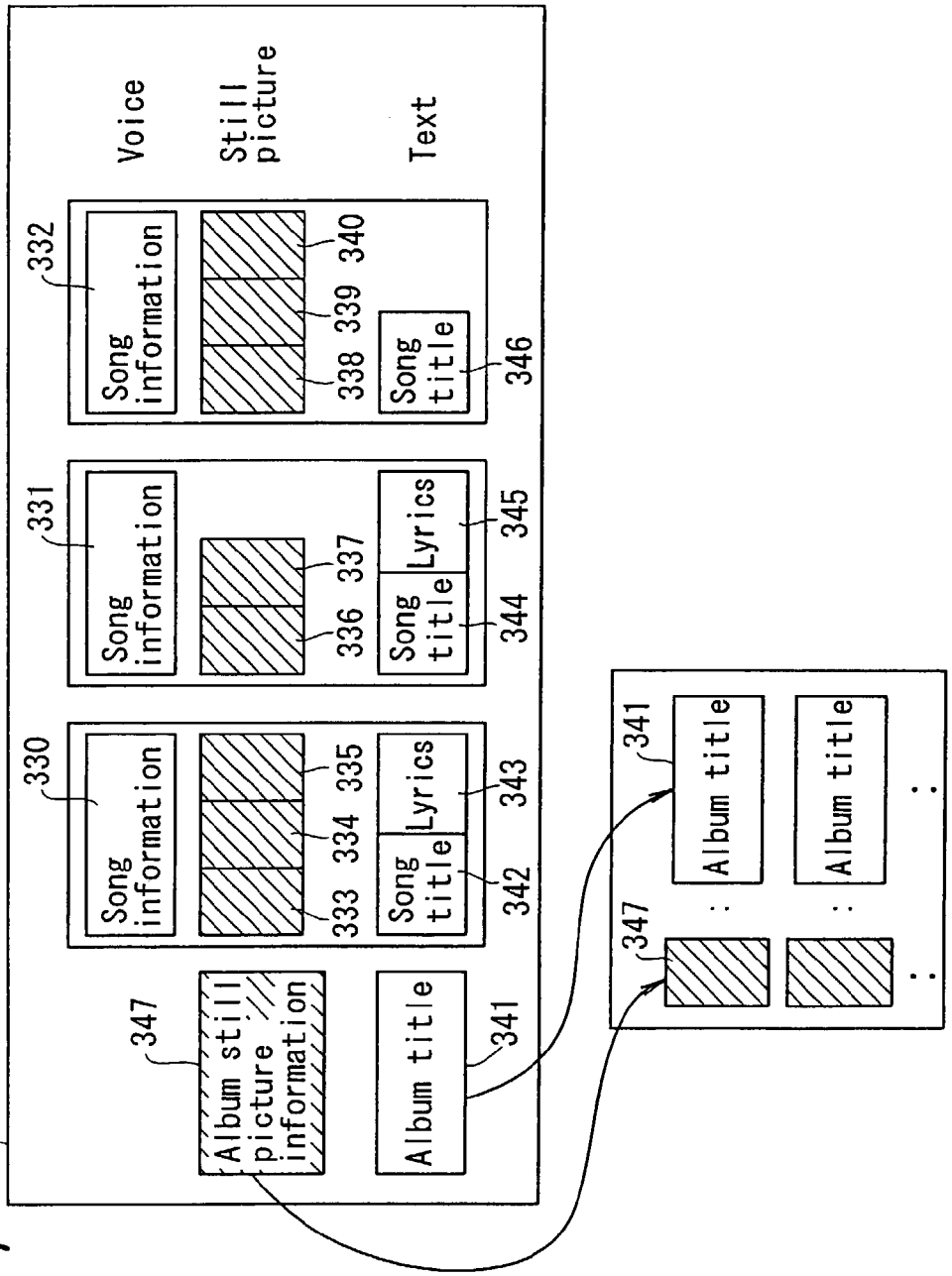
FIG. 14 shows a distributed album content.

Before the reproduction of the song still picture information and the album still picture information, the control section 83 obtains the management information file 220 from the information recording medium 200 via the reading section 82. Upon receiving a song number and instruction information 86 to reproduce the corresponding song from the user, the receiving section 85 outputs the instruction information 86 to the control section 83. The control section 83 analyzes the management information file 220 and controls the reading section 82 such that the reading section 82 reads the song information corresponding to the song number instructed by the instruction information 86 and all the pieces of still picture information associated with the song information from the information recording medium 200. The reading section 82 outputs a set 87 of the song information and still picture information, which have been read, to the reproduction section 84. The control section 83 identifies the type of the read still picture information based on the still picture identification information included in the management information file 220. Based on the identification result, the control section 83 outputs a control signal 88 for controlling the reproduction of the still picture information to the reproduction section 84. While the song information is being reproduced, the control section 83 controls the reproduction section 84 such that the reproduction section 84 selects and displays the still picture information associated with the song still picture identifier. When the receiving section 85 receives instruction information from the user to display the album still picture information while the song information is being reproduced or while a song is being selected, the control section 83 controls the reproduction section 84 such that the reproduction section 84 selects and displays the still picture information corresponding to the album-representative still picture identifier. As shown in FIG. 12, the still picture identification information of the still picture information associated with the song information is read (step S701). When there is still picture information associated with the album-representative still picture identifier, such still picture information is displayed as the album still picture information (step S702).

There are various manners of displaying the album still picture information. According to one exemplary manner, song still picture information associated with the song still picture identifier is displayed while the song information is being reproduced. If the user wishes, the album still picture information is displayed, such that the user can recognize the album content originally including the song information which is being reproduced. According to another exemplary manner, the album still picture information is always displayed on the screen in a small size while the song information is being reproduced. In this way, the user can recognize the album content originally including the song information. According to still another exemplary manner, the album still picture information is displayed on the song search screen together with the song titles. Thus, the album-representative still picture identifier and the song still picture identifier can be defined, which provides the user with a new way of enjoying music.

A plurality of areas of the information recording medium 200 respectively have addresses assigned thereto. It is preferable that an address assigned to an area of the information recording medium 200 in which the album still picture information is to be recorded has a smaller numerical value than that of the address assigned to an area in which the song still picture information is to be recorded. For example, referring to FIG. 9, the address assigned to the area in which the album still picture information 260 associated with the song information 251 included in the play list 270 has a smaller numerical value than that of the address assigned to the area in which each of the pieces of song still picture information 261, 262, 263 and 264 associated with the song information 251 is to be recorded. It is preferable that the management information file 220 is also structured such that an address of the area in which still picture general information associated with album-representative still picture information is to be recorded has a smaller numerical value than that of the address of the area in which still picture general information associated with song still picture information is to be recorded. It is convenient that, among a plurality of types of still picture information associated with a piece of song information, the album still picture information is determined to be recorded at the leading position. In this case, when the album still picture information is to be displayed together with a play list search screen, the reproduction apparatus 81 can retrieve the album still picture information in a short time by analyzing the still picture identification information of the leading still picture information. This alleviates the processing load on the reproduction apparatus 81 and allows the play list search screen to be displayed in a short time.

According to the second example, the type of each piece of still picture information can be identified. Therefore, still picture information can be displayed in various manners, which provides the user with a new way of enjoying music.

According to the second example, the album still picture information is copied and recorded as the still picture information associated with each piece of song information. Even when one of the plurality of pieces of song information is edited to be reproduced from another play list, the user can recognize the album content originally including that piece of song information by merely displaying the album still picture information. Even when a piece of song information and still picture information associated with that piece of song information are copied to another information recording medium, the user can recognize the album content originally including that piece of song information by merely displaying the album still picture information. Thus, a new way of enjoying music can be provided to the user.

An information recording medium according to the present invention includes identification information which indicates whether the information recorded thereon is an album content distributed by electronic distribution or information edited by the user. Since the type of the information recorded thereon can be identified, copyright management can be performed in different manners for different types of information (for example, a certain type of information is permitted to be edited in a limited manner). In addition, a play list which can be arbitrarily edited by the user and an album content distributed by electronic distribution can be managed by the same information recording medium.

An information recording medium according to the present invention includes identification information which indicates, in an album content originally including audio information and still picture information, whether the still picture information is information representative of the entire album content or is information associated with audio information. Since the type of the still picture information can be identified, the reproduction of still picture information can be controlled in a manner corresponding to each type thereof. In the case where audio information is associated with still picture information representing the album content, the user can recognize the type of album content originally including the audio information by reproducing the still picture information representing the album content. By such association, the user can recognize the type of album content originally including the audio information by reproducing the still picture information representing the album content, even when the audio information is transferred from the information recording medium having the album content recorded thereon to another information recording medium.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A recording apparatus for recording information on an information recording medium, wherein the information is one of an album content distributed by electronic distribution and information edited by a user, the recording apparatus comprising:
    an obtaining section for obtaining the information;
    a control section for identifying whether the information is an album content distributed by electronic distribution or information edited by a user, and outputting identification information representing the identification result; and
    a recording section for recording the information and the identification information on the information recording medium, wherein
    the identification information has two values for identifying the type of the information, one representing the information is an album content distributed by electronic distribution and the other representing the information is information edited by a user, and
    the information identified as an album content distributed by electronic distribution has more restriction when being edited than the information identified as information edited by a user.

2. A recording apparatus according to claim 1, wherein the information is one of audio information, still picture information, moving picture information, and text information.

3. An editing apparatus for editing information recorded on an information recording medium, wherein the information recording medium has, recorded thereon, identification information which indicates whether the information is an album content distributed by electronic distribution or information edited by a user, the editing apparatus comprising:
    a reading section for reading the identification information from the information recording medium; and
    a control section for identifying whether the information is an album content distributed by electronic distribution or information edited by a user, and editing the information in accordance with a restriction corresponding to the identification result, wherein
    the identification information has two values for identifying the type of the information, one representing the information is an album content distributed by electronic distribution and the other representing the information is information edited by a user, and
    the information identified as an album content distributed by electronic distribution has more restriction when being edited than the information identified as information edited by a user.

4. An editing apparatus according to claim 3, wherein the information is one of audio information, still picture information, moving picture information, and text information.

5. A recording method for recording information on an information recording medium, wherein the information is one of an album content distributed by electronic distribution and information edited by a user, the recording method comprising the steps of:
    obtaining the information; identifying whether the information is an album content distributed by electronic distribution or information edited by a user, and outputting identification information representing the identification result; and
    recording the information and the identification information on the information recording medium recording medium, wherein
    the identification information has two values for identifying the type of the information, one representing the information is an album content distributed by electronic distribution and the other representing the information is information edited by a user, and the information identified as an album content distributed by electronic distribution has more restriction when being edited than the information identified as information edited by a user.

6. A recording method according to claim 5, wherein the information is one of audio information, still picture information, moving picture information, and text information.

7. An editing method for editing information recorded on an information recording medium, wherein the information recording medium has, recorded thereon, identification information which indicates whether the information is an album content distributed by electronic distribution or information edited by a user, the editing method comprising the steps of:
    reading the identification information from the information recording medium; and
    identifying whether the information is an album content distributed by electronic distribution or information edited by a user, and editing the information in accordance with a restriction corresponding to the identification result, wherein
    the identification information has two values for identifying the type of the information, one representing the information is an album content distributed by electronic distribution and the other representing the information is information edited by a user, and
    the information identified as an album content distributed by electronic distribution has more restriction when being edited than the information identified as information edited by a user.

8. An editing method according to claim 7, wherein the information is one of audio information, still picture information, moving picture information, and text information.

* * * * *

UNITED STATES PATENT AND TRADEMARK OFFICE
CERTIFICATE OF CORRECTION

PATENT NO. : 7,522,814 B2
APPLICATION NO. : 10/390226
DATED : April 21, 2009
INVENTOR(S) : Noriaki Horii and Masatoshi Shimbo It is certified that error appears in the above-identified patent and that said Letters Patent is hereby corrected as shown below:

Column 18, lines 24-25, "information recording medium recording medium," should read -- information recording medium, --.

Signed and Sealed this

Twenty-seventh Day of October, 2009

David J. Kappos
*Director of the United States Patent and Trademark Office*